US012309314B2

(12) United States Patent
Nobara

(10) Patent No.: US 12,309,314 B2
(45) Date of Patent: May 20, 2025

(54) DISPLAY CONTROL DEVICE, DISPLAY CONTROL METHOD, AND RECORDING MEDIUM HAVING DISPLAY CONTROL PROGRAM RECORDED THEREON

(71) Applicant: HONDA MOTOR CO., LTD., Tokyo (JP)

(72) Inventor: Yu Nobara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 17/901,160

(22) Filed: Sep. 1, 2022

(65) Prior Publication Data

US 2023/0091894 A1   Mar. 23, 2023

(30) Foreign Application Priority Data

Sep. 21, 2021   (JP) .................... 2021-153283

(51) Int. Cl.
| | | |
|---|---|---|
| H04M 1/72 | (2021.01) | |
| G06F 3/16 | (2006.01) | |
| H04M 1/72469 | (2021.01) | |
| H04M 1/72484 | (2021.01) | |
| H04M 1/60 | (2006.01) | |
| H04M 1/72409 | (2021.01) | |

(52) U.S. Cl.
CPC .......... *H04M 1/72484* (2021.01); *G06F 3/16* (2013.01); *H04M 1/72469* (2021.01); *H04M 1/6091* (2013.01); *H04M 1/724098* (2022.02)

(58) Field of Classification Search
CPC ....................................................... H04W 1/72
See application file for complete search history.

(56) References Cited

U.S. PATENT DOCUMENTS 8,155,709 B2 * 4/2012 Abeta .................... H04M 19/04
455/567
10,499,207 B2 * 12/2019 Chang ................ G01C 21/3697

FOREIGN PATENT DOCUMENTS

WO       2021/053366       3/2021

* cited by examiner

*Primary Examiner* — Michael T Vu
(74) *Attorney, Agent, or Firm* — Rankin, Hill & Clark LLP

(57) ABSTRACT

A display control device includes an incoming call detection unit and a display control unit that controls a display by providing a first display area and a second display area on a touch panel, and when the incoming call is detected, the display control unit displays an answer button and an ignore button of the incoming call in the second display area and sets at least one of starting buttons displayed in the first display area to an inoperable state.

9 Claims, 7 Drawing Sheets

DISPLAY CONTROL DEVICE, DISPLAY CONTROL METHOD, AND RECORDING MEDIUM HAVING DISPLAY CONTROL PROGRAM RECORDED THEREON

INCORPORATION BY REFERENCE

The present application claims priority under 35 U.S.c. § 119 to Japanese Patent Application No. 2021-153283 filed on Sep. 21, 2021. The content of the applications is incorporated herein by reference in its entirety.

BACKGROUND OF THE INVENTION

Field of the Invention

The present invention relates to a display control device, a display control method, and a recording medium having a display control program recorded thereon.

Description of the Related Art

A display device for a vehicle is disclosed in International Publication No. WO 2021/053366 in which when an incoming call is detected while a map screen such as a navigation screen is displayed on a touch panel, operation buttons used by a user for answering or holding to the incoming call are displayed on the map screen in a manner of being superimposed. In the display device for a vehicle, a size of a display area for the operation buttons used for the answering or holding to the incoming call is changed according to information displayed on the touch panel during an incoming call, and thus an information quantity that can be provided to the user during the incoming call is adjusted.

With an increase in functions provided in a vehicle, the in-vehicle touch panel displays various operation buttons related to a plurality of devices including an audio output device, a video device, a navigation device, and a short-range wireless device such as Bluetooth (registered trademark) or the like. For this reason, the user may feel inconvenience such as an erroneous operation of an unintended operation button depending on the arrangement of these operation buttons. Such inconvenience may become more prominent and affect the convenience of the user as the number of users who drive first-time vehicles and unfamiliar vehicles increases with the development of share car services.

According to the related art disclosed in International Publication No. WO 2021/053366 described above, the information quantity that can be provided to the user at the time of incoming call is adjusted, but there is room for improvement from the viewpoint of operability of button operation.

In particular, since the answer to an incoming call in the vehicle also affects the safety of the vehicle traveling, it is desirable to improve the operability of the operation buttons at the time of incoming call. The button operation during the vehicle traveling can be affected by the age and physical condition of a driver who operates the button, and thus the improvement in the convenience of the button operation and the safety securement of the vehicle traveling through the improvement in the convenience of the button operation can improves the quality of driving behavior of persons with various characteristics, improve fulfillment of their lives, and contribute to the achievement of SDGs and the realization of a sustainable society (SDGs: 3.6, 10.2, 11.2).

From the above circumstances, an object of the present invention is to improve operability of an answer operation and an ignore operation that the user performs on the in-vehicle touch panel at the time of incoming call.

SUMMARY OF THE INVENTION

A first aspect of the present invention provides a display control device that controls an operation of a touch panel arranged in a vehicle in cooperation with a phone device in the vehicle, the display control device including: an incoming call detection unit that detects an incoming call on the phone device; and a display control unit that controls the operation of the touch panel, the display control unit being configured to: provide, on a display screen of the touch panel, a first display area for displaying each of buttons used to start operating each of predetermined functions and a second display area adjacent to the first display area; and when the incoming call detection unit detects the incoming call on the phone device, display, in the second display area, an answer button for instructing the phone device to start a phone call to the incoming call and an ignore button for instructing the phone device not to answer to the incoming call, and set at least a part of the buttons displayed in the first display area to an inoperable state.

In the first aspect of the present invention, the first display area is arranged along a side of the touch panel on a driver's seat side of the vehicle, and the answer button and/or the ignore button are arranged at positions adjacent to the first display area in the second display area.

In the first aspect of the present invention, the buttons displayed in the first display area include a common use button that is maintained in an operable state even when the incoming call detection unit detects the incoming call on the phone device, and the common use button is arranged at a position in the first display area that is not adjacent to the answer button and the ignore button displayed in the second display area.

In the first aspect of the present invention, the answer button and the ignore button are arranged on one of opposite sides of the touch panel in an up-down direction, and the common use button displayed in the first display area is arranged on the other of opposite sides of the touch panel in the up-down direction.

In the first aspect of the present invention, the display control unit hides the answer button and the ignore button when the common use button is operated.

In the first aspect of the present invention, the common use button includes at least one of: a back button used to return a display of the first display area and the second display area to a display before the incoming call is detected; and a home button used to return the second display area to a home screen which is a predetermined initial screen.

In the first aspect of the present invention, when the common use button is pressed in a case where the incoming call detection unit detects the incoming call on the phone device, the display control unit displays, in the second display area, a message indicating that an audio output is in a mute state and a message indicating that the incoming call is detected.

A second aspect of the present invention provides a display control method of controlling an operation of a touch panel arranged in a vehicle in cooperation with a phone device in the vehicle, the operation being executed by a computer, the display control method including: an incoming call detection step of detecting an incoming call on the phone device; and a display control step controlling the operation of the touch panel, the display control step including: providing, on a display screen of the touch panel, a first display area for displaying each of buttons used to start operating each of predetermined functions and a second display area adjacent to the first display area; and when the incoming call on the phone device is detected in the incoming call detection step, displaying, in the second display area, an answer button for instructing the phone device to start a phone call to the incoming call and an ignore button for instructing the phone device not to answer to the incoming call, and setting at least a part of the buttons displayed in the first display area to an inoperable state.

A third aspect of the present invention provides a non-transitory computer-readable recording medium having a display control program recorded thereon, the display control program causing a computer of a display control device, which controls an operation of a touch panel arranged in a vehicle in cooperation with a phone device in the vehicle, to function as: an incoming call detection unit that detects an incoming call on the phone device; and a display control unit that controls the operation of the touch panel, the display control unit being configured to: provide, on a display screen of the touch panel, a first display area for displaying each of buttons used to start operating each of predetermined functions and a second display area adjacent to the first display area; and when the incoming call detection unit detects the incoming call on the phone device, display, in the second display area, an answer button for instructing the phone device to start a phone call to the incoming call and an ignore button for instructing the phone device not to answer to the incoming call, and set at least a part of the buttons displayed in the first display area to an inoperable state.

According to the aspects of the present invention, it is possible to improve operability of an answer operation and an ignore operation that a user performs on an in-vehicle touch panel at the time of incoming call.

DETAILED DESCRIPTION OF THE PREFERRED EMBODIMENT

Hereinafter, an embodiment of the present invention will be described with reference to the drawings.

Figure 1:
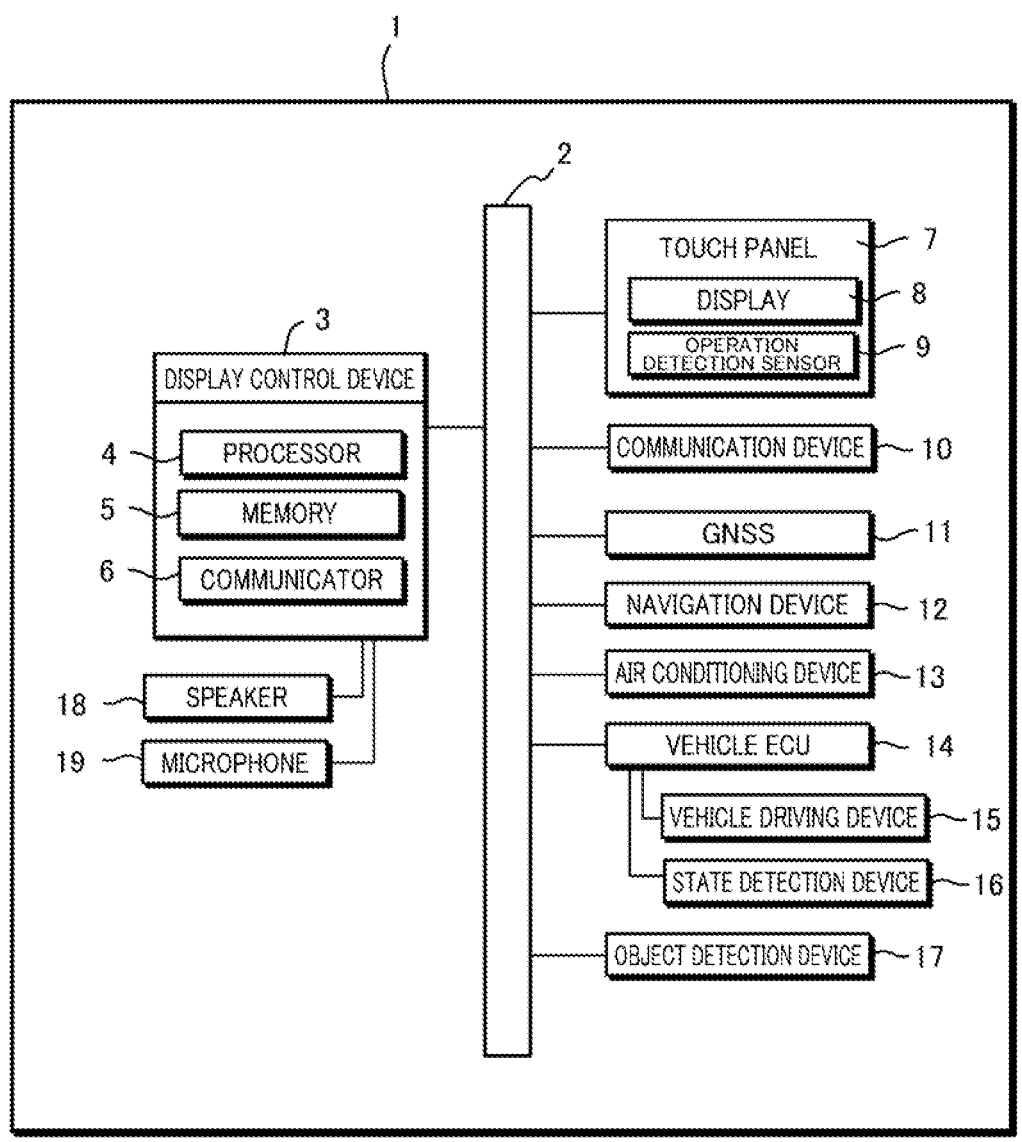
FIG. 1 is a configuration diagram of a vehicle including a display control device according to an embodiment of the present invention.

FIG. 1 is a configuration diagram of a vehicle 1 including a display control device 3 of the present embodiment.

The display control device 3 communicates, via an in-vehicle connection link 2, with in-vehicle devices of the vehicle 1, for example, a touch panel 7, a communication device 10, a GNSS receiver 11 (GNSS: Global Navigation Satellite System), a navigation device 12, an air conditioning device 13, a vehicle ECU 14, and an object detection device 17.

The in-vehicle connection link 2 may be composed of a plurality of communication transmission lines conforming to various different communication standards. For example, the in-vehicle connection link 2 may include not only a plurality of network transmission lines connected to each other via a device having a gateway function but also a transmission line for performing P2P communication (peer-to-peer communication). Such network transmission lines may include various communication buses that perform network communication conforming to various communication standards such as CAN, Ethernet (registered trademark), and USB. The connection between the in-vehicle devices through any transmission line can be appropriately selected according to the information quantity to be communicated between the in-vehicle devices, for example, according to the related art and/or the frequency of communication.

The display control device 3 controls a display operation of the touch panel 7 which is a display device. The display control device 3 can be configured as, for example, a so-called DA (display/audio) having a function of reproducing music or moving images in addition to the function of controlling the display operation.

The display control device 3 includes a processor 4, a memory 5, and a communicator 6. The processor 4 is a computer included in the display control device 3, and is composed of one or a plurality of central processing units (CPUs) or micro processing units (MPUs), for example.

The memory 5 is composed of, for example a volatile and/or non-volatile semiconductor memory and/or a hard disk device.

The communicator 6 is a transmitter/receiver that performs short-range wireless communication conforming to a near-field communication standard such as Bluetooth (registered trademark) or Wi-Fi (registered trademark).

The touch panel 7 includes a display 8 and an operation detection sensor 9. The display 8 is formed of a liquid crystal display (LCD). The operation detection sensor 9 is a touch sensor that is provided on a surface of the display 8 to detect a user's operation.

The communication device 10 is a wireless device conforming to the communication standard of the mobile communication system.

The GNSS receiver 11 detects a position of the vehicle 1.

The navigation device 12 executes a route search to a destination designated by an operation of the touch panel 7, and displays a map and the position of vehicle 1 on the display 8 to perform route guidance, for example. The air conditioning device 13 adjusts temperature and/or humidity in the interior of the vehicle 1.

The vehicle ECU 14 is an electronic control unit (ECU) that controls various operations of the vehicle 1. The vehicle 1 may include a plurality of ECUs. The vehicle ECU 14 schematically shows such a plurality of ECUs. For example, the ECU in the vehicle 1 includes an ECU that controls an operation of a vehicle driving device 15 such as a motor or an engine. Further, the ECU in the vehicle 1 includes an ECU that detects a state of the vehicle 1 (for example, a motion state such as speed, a charge state of a battery, or an operation state of an accelerator pedal and the like) based on sensor information from a state detection device 16 and outputs state information.

The state detection device 16 includes a sensor that detects a vehicle state related to a traveling operation of the vehicle 1 and a sensor that detects a state of an occupant. The sensor configured to detect the vehicle state related to the traveling operation may include a vehicle speed sensor, a steering angle sensor, an accelerator pedal sensor, a brake pedal sensor, and a voltage sensor and a current sensor provided in the battery. The sensor configured to detect the state of the occupant may include seatbelt switches, seat occupancy sensors, in-vehicle cameras and the like.

The object detection device 17 detects an object existing around the vehicle 1 with an outside-vehicle camera, a radar, a rider, or a sonar, and outputs detection information to another in-vehicle device.

Figure 2:
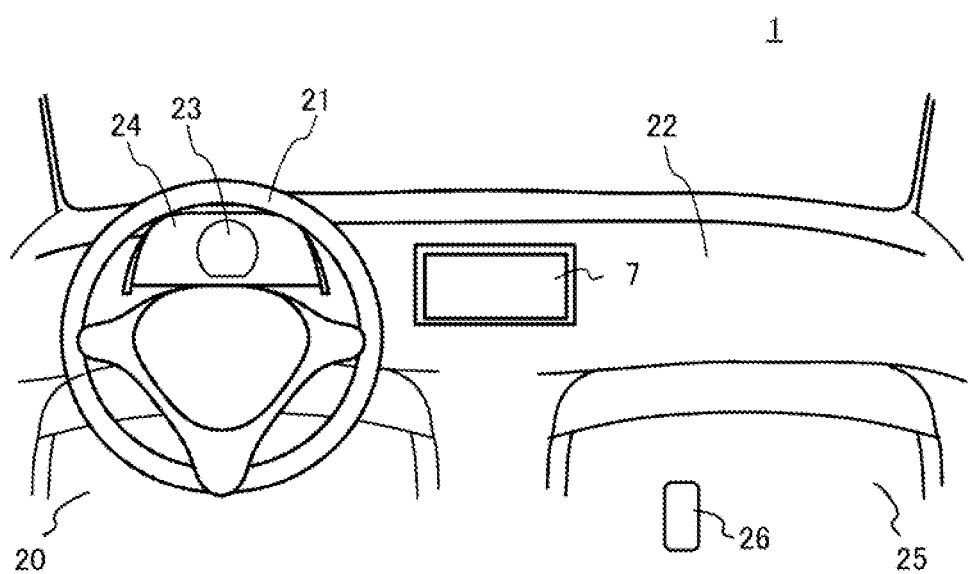
FIG. 2 is a view showing an example of an arrangement of a touch panel in a vehicle interior.

FIG. 2 is a view showing an example of an arrangement of the touch panel 7 in the interior of the vehicle 1. In the present embodiment, the vehicle 1 is a so-called left-hand drive vehicle in which a driver's seat 20 and a steering wheel 21 are on a left side in a forward advancing direction. A display panel 24 is arranged on a left side of an instrument panel 22, which can be visually recognized when a driver seated in a driver's seat 20 faces forward, to display various instruments including a speed meter 23. The touch panel 7 is arranged at a center of the instrument panel 22 in a vehicle width direction, that is, between the driver's seat 20 and a passenger seat 25.

Further, a mobile terminal 26 such as a smartphone, which is a phone device, is placed in the vehicle interior. The mobile terminal 26 is communicably connected to the display control device 3 by a short-range wireless such as Bluetooth. In the following description, it is assumed that the mobile terminal 26 has completed a process for establishing communication with the display control device 3 and starts communication with the display control device 3. After the start of communication, the mobile terminal 26 performs an output of a ringing tone at the time of incoming call and an audio output and an audio input for phone call using a speaker 18 and a microphone 19 in the vehicle via an AV function unit 32 (to be described below) of the display control device 3 according to the related art. Further, when there is an incoming call, the mobile terminal 26 sends caller information to the display control device 3 based on a phone number of a caller and address information stored in the mobile terminal 26.

Figure 3:
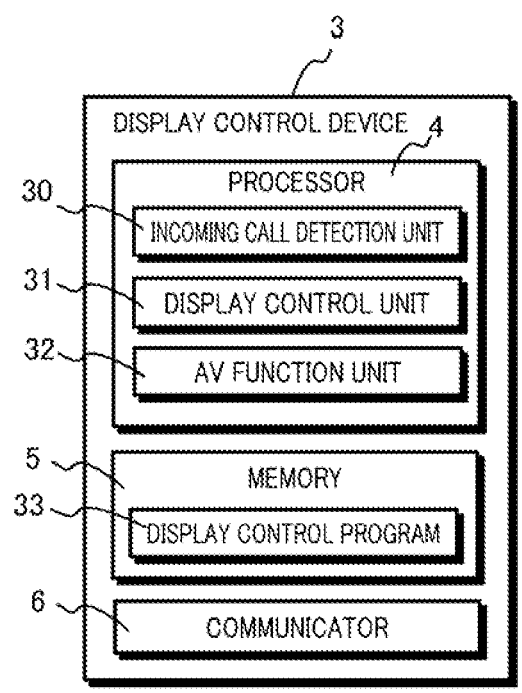
FIG. 3 is a diagram showing a configuration of the display control device.

FIG. 3 is a diagram showing a functional configuration of the display control device 3. The display control device 3 controls the operation of the touch panel 7 arranged on the vehicle 1 in cooperation with a phone device in the vehicle 1. In the present embodiment, the phone device is the mobile terminal 26 placed in the vehicle 1.

The processor 4 includes, as functional components or functional units, a incoming call detection unit 30, a display control unit 31, and an AV function unit 32 (audio/video function unit). These functional components in the processor 4 are realized when the processor 4 as a computer executes a display control program 33 which is a computer program stored in the memory 5, for example. Alternatively, all or part of the functional components included in the processor 4 may be composed of hardware including one or more electronic circuit components. The display control program 33 can be stored in any computer-readable storage medium such as an optical disk, a magnetic disk, and a flash memory.

AV function unit 32 reproduces music and moving images using a display 8 and a speaker 18 of the touch panel 7 according to the related art, communicates with a mobile terminal 26 in the interior of the vehicle 1, and provides a hands-free call function by the speaker 18 and the microphone 19 when there is an incoming call to the mobile terminal 26. Further, upon receiving a notification of the incoming call and caller information from the mobile terminal 26, the AV function unit 32 sends the notification and the information to the incoming call detection unit 30 and outputs a phone ringing tone through the speaker 18.

The incoming call detection unit 30 detects an incoming call on the mobile terminal 26, which is a phone device, via the AV function unit 32.

The display control unit 31 cooperates with other in-vehicle devices connected to the in-vehicle connection link 2, controls the operation of the touch panel 7, and displays information necessary for the operation of these in-vehicle devices on the touch panel 7. Further, the display control unit 31 acquires the input to the in-vehicle device through the touch panel 7 from the user, and sends the input to the corresponding in-vehicle device.

A display screen of the touch panel 7 is provided with a first display area in which buttons used to start operating predetermined functions and a second display area adjacent to the first display area, and the display control unit 31 controls the operation of the touch panel 7 in the first display area and the second display area.

Figure 4:
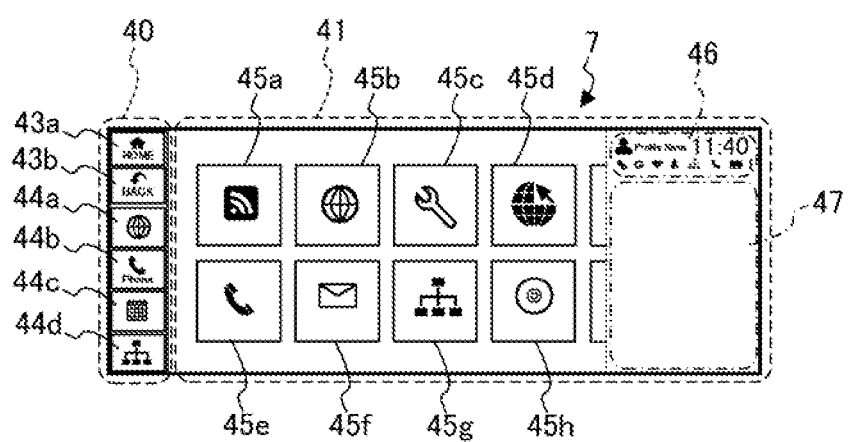
FIG. 4 is a diagram showing an example of a first display area and a second display area provided on a display screen of a touch panel by a display control unit.

FIG. 4 shows an example of the first display area and the second display area provided on the display screen of the touch panel 7 by the display control unit 31. The display control unit 31 displays an initial screen having a configuration shown in FIG. 4 on the touch panel 7 when the display control device 3 is powered on, for example. In the shown example, the first display area 40 is arranged along a left side of the touch panel 7, that is, a side of the driver's seat. Further, the second display area 41 is arranged on a right side of the first display area 40 to be adjacent to the first display area 40.

In the second display area 41, various screens can be displayed according to the user's operation. In the second display area 41 of FIG. 4, a home screen is shown as an example. On the home screen, eight buttons 45a, 45b, 45c, 45d, 45e, 45f, 45g, and 45h are displayed. The buttons 45a, 45b, 45c, 45d, 45e, 45f, 45g, and 45h displayed in the second display area 41 are, for example, starting buttons used to start operating predetermined functions executed by specific application programs, respectively. Hereinafter, buttons including the buttons 45a, 45b, 45c, 45d, 45e, 45f, 45g, and 45h displayed on the home screen in the second display area 41 are collectively referred to as a button 45. For example, when the user performs a swiping operation to the left in the second display area 41, the starting button, which cannot be displayed all at once in a space of the second display area 41, is displayed in the second display area 41.

For example, the button 45b is an starting button that starts operating the navigation function of the navigation device 12. When the user presses the button 45b, the display control unit 31 of the display control device 3 switches the display in the second display area 41 to a navigation screen including a map screen provided by the navigation device and the operation button for setting the destination. Further, for example, the button 45e is a call button, and is used when a phone function of the mobile terminal 26 is used by the hands-free call function.

In the example of FIG. 4, in the area on the right side of the second display are 41, an indicator display area 46 provided to display a time and a predetermined indicator, and an information display area 47 is further provided to indicate detailed information related to the function currently being executed.

Six buttons 43a, 43b, 44a, 44b, 44c, and 44d are displayed in the first display area 40 to be used to start operating predetermined functions. The button 43a is a so-called home button used when the user displays a home screen in the second display area 41. Further, the button 43b is a so-called back button, and is used to return a display of the second display area 41 of which screen is switched according to the user's operation, to an immediately preceding screen. The buttons 43a and 43b are common use buttons that are always maintained in an operable state. These common use buttons are displayed in a normal mode indicating an operable state even when the incoming call detection unit 30 detects an incoming call, for example. In the present embodiment, both the button 43a as the home button and the button 43b as the back button are used as common use buttons, but at least one of the buttons may be used as a common use button.

Each of the buttons 44a, 44b, 44c, and 44d displayed in the first display area 40 is, for example, a shortcut button corresponding to any of the buttons 45 displayed in the second display area 41. By operating these shortcut buttons, the user can start operating the function of each of the buttons 45 corresponding to each of the shortcut buttons without performing a swiping operation for the second display area 41. Hereinafter, the buttons 44a, 44b, 44c, and 44d are collectively referred to as a button 44.

When the incoming call detection unit 30 detects an incoming call on the mobile terminal 26, the display control unit 31 shown in FIG. 3 displays, in the second display area, an answer button for instructing the mobile terminal 26 to start a phone call to the incoming call and an ignore button for instructing the mobile terminal 26 not to answer to the incoming call. Further, when the display control unit 31 displays the answer button and the ignore button in the second display area, the display control unit 31 sets at least a part of the buttons displayed in the first display area to an inoperable state, and displays at least a part of the buttons in a form indicating an inoperable state.

Specifically, the display control unit 31 arranges the answer button and/or the ignore button at a position adjacent to the first display area in the second display area. At this time, the display control unit 31 arranges the answer button and the ignore button such that the common use button is arranged at a position not adjacent to the answer button and the ignore button displayed in the second display area.

For example, the display control unit 31 arranges the answer button and the ignore button on one of opposite sides of the touch panel 7 in an up-down direction, and arranges the common use button displayed in the first display area on the other of opposite sides of the touch panel 7 in the up-down direction.

Figure 5:
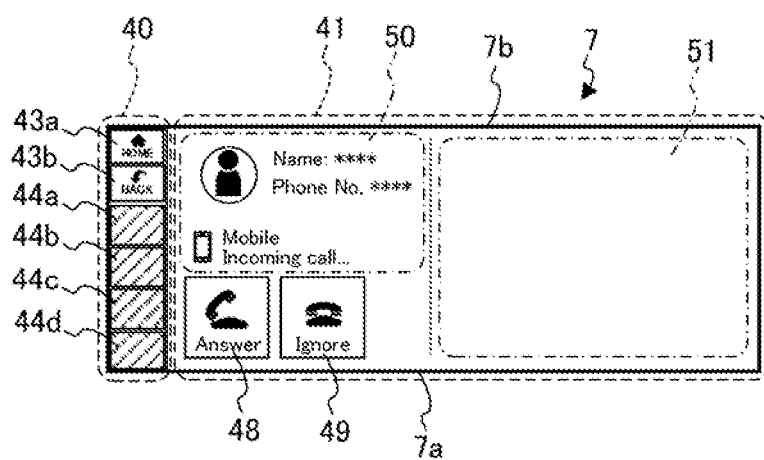
FIG. 5 is a diagram showing an example of a display of answer buttons and ignore buttons on the touch panel.

FIG. 5 shows an example of a display screen of the touch panel 7 when the display control unit 31 displays the answer button and the ignore button. In the shown example, the answer button 48 and the ignore button 49 are arranged side by side in a left-right direction, and are arranged on a lower side 7a of the touch panel 7 at a position adjacent to the first display area 40 in the second display area 41. Further, the buttons 43a and 43b, which are common use buttons, are arranged on an upper side 7b of the touch panel 7 opposite to the lower side 7a in the first display area 40.

In the example of FIG. 5, the buttons 44a, 44b, 44c, and 44d, which are parts of the buttons displayed in the first display area 40, are displayed in a form indicating an inoperable state, for example, in gray out (shown by diagonal hatching in FIG. 5). A left and right position relationship of the answer button 48 and the ignore button 49 shown in FIG. 5 may be reverse to the arrangement as shown in FIG. 5.

In the example of FIG. 5, a caller information 50 including an image, a name, and a phone number of a caller is further displayed above a portion of the second display area 41 where the answer button 48 and the ignore button 49 are displayed. In the area 51 on the right side of the second display area 41, arbitrary information can be displayed including detailed information of the caller for the current incoming call, a call history, or an incoming history.

The display control unit 31 shown in FIG. 3 hides the answer button and the ignore button (that is, erases the display of these buttons from the second display area) when the common use button in the first display area is operated in the case where the display control unit 31 further displays the answer button and the ignore button in the second display area. Further, when the display control unit 31 hides the answer button and the ignore button due to the operation of the common use button, the display control unit 31 instructs the AV function unit 32 to stop an output of audio from the speaker 18 and to display, in the second display area, a message indicating that the audio output is in a mute state and a message indicating that the incoming call is being detected.

Figure 6:
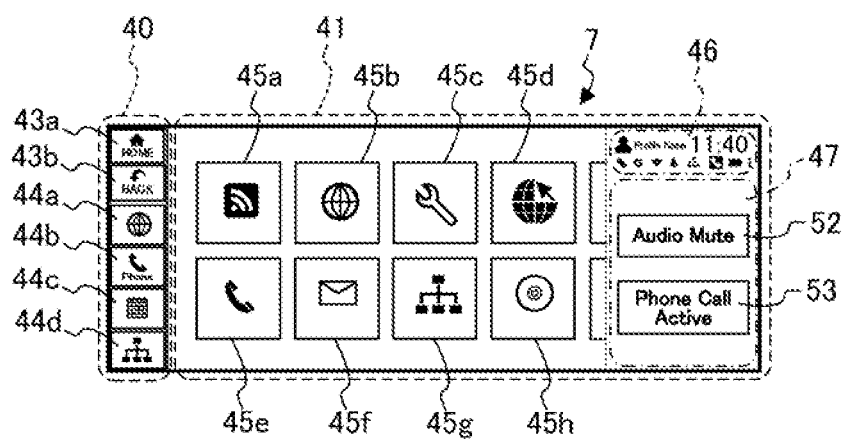
FIG. 6 is a diagram showing an example of a screen of the touch panel after the answer button and the ignore button are hidden by pressing of a common use button.

FIG. 6 shows an example of a display screen of the touch panel 7 after the answer button and the ignore button are hidden by pressing of the common use button. In the example shown in FIG. 6, when the button 43a or 43b (that is, a home button or a back button), which is the common use button in the screen shown in FIG. 5, is pressed, a home screen similar to the screen shown in FIG. 4 is displayed in the second display area 41. However, unlike the screen of FIG. 4, an information display area 47 on the right side of the second display area 41 displays a mute message 52 indicating that the audio output is in a mute state and an incoming message 53 indicating that the incoming call is detected.

The display control device 3 having the above configuration includes, on the display screen of the touch panel 7, the first display area 40 for displaying the buttons used to start operating the predetermined functions and the second display area 41 adjacent to the first display area 40. Then, when an incoming call is received, the display control device 3 displays the answer button 48 and the ignore button 49 related to the incoming call at the position in the second display area 41 adjacent to the first display area 40, and sets at least a part of the buttons displayed in the first display area 40 to the inoperable state.

Thus, the user does not erroneously operate the buttons in the first display area when operating the answer button 48 or the ignore button 49 displayed in the second display area 41, whereby the erroneous operation of the buttons is prevented and the operability of the answer operation and the ignore operation during the incoming call is improved on the touch panel 7.

Figure 7:
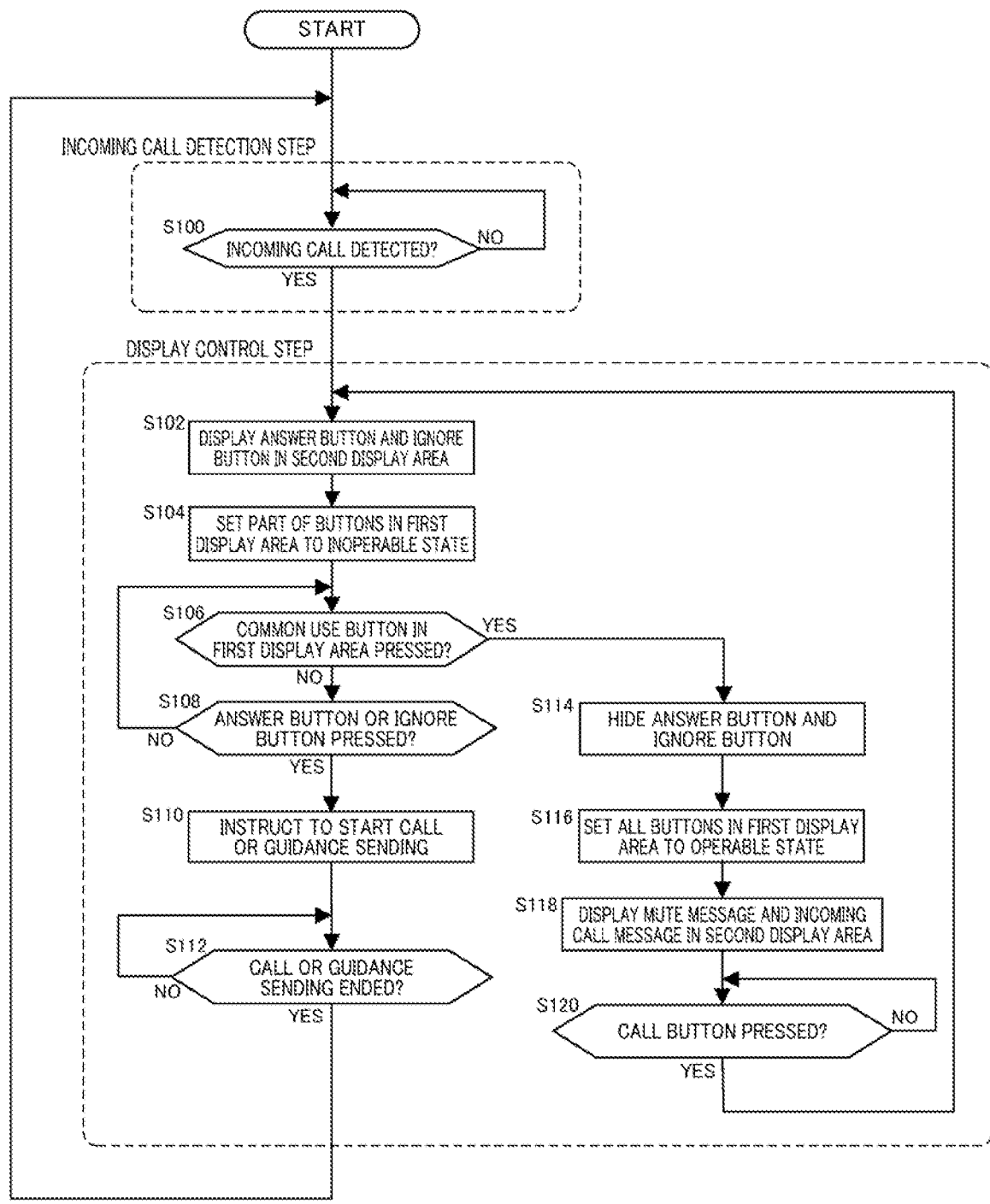
FIG. 7 is a flowchart showing an example of a procedure of an incoming call operation in the display control device.

Next, a procedure of the operation related to the incoming call (hereinafter, referred to as an incoming call operation) in the display control device 3 will be described. FIG. 7 is a flowchart showing an example of the procedure of the incoming call operation in the display control device 3. The process of FIG. 7 starts after the display control device 3 is powered on and the display control unit 31 displays the initial screen shown in FIG. 4. Further, the process of FIG. 7 ends when the display control device 3 is powered off.

Here, in FIG. 7, step S100 corresponds to an incoming call detection step, and steps S102 to S120 correspond to display control steps.

When the process starts, the incoming call detection unit 30 of the display control device 3 determines whether an incoming call is detected (S100). In the present embodiment, the incoming call detection unit 30 detects whether there is the incoming call to the mobile terminal 26, which is a phone device, via the AV function unit 32. Then, when it is determined that the incoming call is not detected (NO in S100), the process returns to step S100, and the incoming call detection unit 30 repeats the process and waits for an incoming call.

On the other hand, when the incoming call is detected (YES in S100), the display control unit 31 displays the answer button 48 and the ignore button 49 related to the detected incoming call at a position adjacent to the first display area 40 in the second display area 41 on the display screen of the touch panel 7 (S102).

Subsequently, as shown in FIG. 5, the display control unit 31 sets at least a part of the buttons displayed in the first display area 40 to an inoperable state, and displays these buttons in a form (for example, in gray out) indicating the inoperable state (S104).

Next, the display control unit 31 determines whether the button 43a or 43b, which is a common use button displayed in the first display area 40, is pressed (S106). Then, when any of the common use buttons is pressed (YES in S106), the display control unit 31 hides the answer button 48 and the ignore button 49 displayed in the second display area 41 in step S102 (S114). Further, the display control unit 31 sets the button 44, which is displayed in a form indicating the inoperable state among the buttons 44 in the first display area 40 in step S14, to an inoperable state, and displays such button 44 in a normal form indicating the inoperable state (S116).

Further, the display control unit 31 instructs the AV function unit 32 to stop the output of the audio from the speaker 18 and to display, in the information display area 47 of the second display area 41, for example, the mute message 52 indicating that the audio output is in a mute state and the incoming message 53 indicating that the incoming call is being detected. (S118).

Subsequently, the display control unit 31 determines whether the call button for accessing the phone function (for example, the button 44c in the first display area 40 or the button 45e in the second display area 41 shown in FIG. 6) is pressed (S120). Then, when the call button is not pressed (NO in S120), the process returns to step S120, and the display control unit 31 repeats the process and waits for pressing of the call button. When any button other than the call buttons displayed in the first display area 40 or the second display area 41 is pressed during the period of waiting for pressing of the call button, the display control unit 31 can continue the process by returning to step S120 after executing a process assigned to the pressed button.

On the other hand, when it is determined in step S120 that the call button is pressed (YES in S120), the process returns to step S102, and the display control unit 31 repeats the process.

On the other hand, when it is determined in step S106 that the common use buttons (that is, the buttons 43a and 43b) in the first display area 40 are not pressed (NO in S106), the display control unit 31 determines whether the answer button 48 or the ignore button 49 is pressed (S108).

Then, when all of the answer button 48 and the ignore button 49 are not pressed (NO in S108), the process returns to step S106, and the display control unit 31 repeats the process. On the other hand, when the answer button 48 or the ignore button 49 is pressed (YES in S108), the display control unit 31 instructs the AV function unit 32 to start a call or to send a guidance message for ignore to the caller (guidance sending) depending on whether any of the answer button 48 or the ignore button 49 is pressed (S110). The guidance message may be instructed by sending of an audio message such as "currently unable to answer the phone". Instead of the guidance sending, the display control unit 31 may instruct the AV function unit 32 to leave the incoming call.

When the sending of the guidance message is completed in the mobile terminal 26, the AV function unit 32 sends a notification of the end of sending of the guidance message to the display control device 3. Further, when the answer button 48 is pressed in step S108, the display control unit 31 instructs the AV function unit 32 to start a call with the mobile terminal 26 according to the related art, and displays, in the second display area 41, a call end button (not shown) used to end the call by the user.

Subsequently, the display control unit 31 determines whether the call or the guidance sending started in in step S110 is ended (S112). Then, when the call or the guidance sending is not ended (NO in S112), the process returns to step S112, and the display control unit 31 repeats the process and waits for the end of the call or the guidance. When the call end button described above is pressed, the display control unit 31 can determine that the call is ended. Further, the display control unit 31 can determine that the guidance sending is ended by receiving the notification of the end of sending of the guidance message from the AV function unit 32.

On the other hand, when it is determined in step S112 that the call or the guidance sending is ended (YES in S112), the display control unit 31 returns the process to step S100. Thus, the display control unit 31 waits for a new incoming call at step S100.

The present invention is not limited to the configuration of the above embodiment, and can be implemented in various aspects without departing from the gist thereof.

For example, the phone device is assumed to be the mobile terminal 26 in the above-described embodiment, but is not limited thereto. The phone device may be an in-vehicle phone device connected to the in-vehicle connection link 2.

Further, the display control device 3 is configured as a display/audio including the AV function unit 32 and capable of reproducing music and moving images in the above-described embodiment, but the AV function unit 32 included in the display control device 3 is not always essential to control the display operation of the touch panel 7 according to the present invention. For example, the function of the AV function unit 32 may be realized as an AV device independent of the display control device 3, and the AV device may cooperate with the mobile terminal 26 to realize a hands-free call. In this case, for example, when the mobile terminal 26 receives an incoming call, the display control device 3 may detect the incoming call on the mobile terminal by receiving the incoming notification from the AV device via the in-vehicle connection link 2.

The above embodiment supports the following configurations.

(Configuration 1) A display control device that controls an operation of a touch panel arranged in a vehicle in cooperation with a phone device in the vehicle, the display control device including: an incoming call detection unit that detects an incoming call on the phone device; and a display control unit that controls the operation of the touch panel, the display control unit being configured to: provide, on a display screen of the touch panel, a first display area for displaying each of buttons used to start operating each of predetermined functions and a second display area adjacent to the first display area; and when the incoming call detection unit detects the incoming call on the phone device, display, in the second display area, an answer button for instructing the phone device to start a phone call to the incoming call and an ignore button for instructing the phone device not to answer to the incoming call, and set at least a part of the buttons displayed in the first display area to an inoperable state.

According to the display control device of Configuration 1, since the answer button and the ignore button are displayed in the second display area and a part of the buttons in the first display area is set to the inoperable state, the user does not erroneously operate the buttons in the first display area when operating the answer button or the ignore button, whereby it is possible to improve operability of the answer operation and the ignore operation at the time of incoming call while preventing the erroneous operation of the buttons.

(Configuration 2) In the display control device according to Configuration 1, the first display area is arranged along a side of the touch panel on a driver's seat side of the vehicle, and the answer button or the ignore button are arranged at positions adjacent to the first display area in the second display area.

According to the display control device of Configuration 2, since the answer button or the ignore button is arranged adjacent to the first display area closer to the driver's seat, it is possible to further improve the operability of the answer operation and the ignore operation at the time of incoming call while preventing the erroneous operation of the buttons.

(Configuration 3) In the display control device according to Configuration 1 or 2, the buttons displayed in the first display area include a common use button that is maintained in an operable state even when the incoming call detection unit detects the incoming call on the phone device, and the common use button is arranged at a position in the first display area that is not adjacent to the answer button and the ignore button displayed in the second display area.

According to the display control device of Configuration 3, since the common use button in the first display area is arranged at the position not adjacent to the answer button and the ignore button, the operability of the answer operation and the ignore operation at the time of incoming call is improved, and the erroneous operation of the common use button is also prevented.

(Configuration 4) In the display control device according to Configuration 3, the answer button and the ignore button are arranged on one of opposite sides of the touch panel in an up-down direction, and the common use button displayed in the first display area is arranged on the other of opposite sides of the touch panel in the up-down direction.

According to the display control device of Configuration 4, since the common use button is arranged separately from the answer button and the ignore button on the sides of the touch panel in the up-down direction, the operability of the answer operation and the ignore operation at the time of incoming call is improved, and the erroneous operation of the common use button is further prevented.

(Configuration 5) In the display control device according to Configuration 3 or 4, the display control unit hides the answer button and the ignore button when the common use button is operated.

According to the display control device of Configuration 5, the user can leave the incoming call unattended and use other functions provided by the common use button by operating the common use button.

(Configuration 6) In the display control device according to any one of Configurations 3 to 5, the common use button includes at least one of: a back button used to return a display of the first display area and the second display area to a display before the incoming call is detected; and a home button used to return the second display area to a home screen which is a predetermined initial screen.

According to the display control device of Configuration 6, since the home button and/or the back button are the common use buttons, the answer button and the ignore button can be moved from the display screen to a known screen by these common use buttons, and the operability of the touch panel is improved.

(Configuration 7) In the display control device according to any one of Configurations 3 to 6, when the common use button is pressed in a case where the incoming call detection unit detects the incoming call on the phone device, the display control unit displays, in the second display area, a message indicating that an audio output is in a mute state and a message indicating that the incoming call is detected.

According to the display control device of Configuration 7, the user can know that the incoming call is coming and that the audio output is stopped even when the screen is displayed in which the answer button and the ignore button are not displayed.

(Configuration 8) A display control method of controlling an operation of a touch panel arranged in a vehicle in cooperation with a phone device in the vehicle, the operation being executed by a computer, the display control method including: an incoming call detection step of detecting an incoming call on the phone device; and a display control step controlling the operation of the touch panel, the display control step including: providing, on a display screen of the touch panel, a first display area for displaying each of buttons used to start operating each of predetermined functions and a second display area adjacent to the first display area; and when the incoming call on the phone device is detected in the incoming call detection step, displaying, in the second display area, an answer button for instructing the phone device to start a phone call to the incoming call and an ignore button for instructing the phone device not to answer to the incoming call, and setting at least a part of the buttons displayed in the first display area to an inoperable state.

According to the display control method of Configuration 8, since the answer button and the ignore button are displayed in the second display area and a part of the buttons in the first display area is set to the inoperable state, the user does not erroneously operate the buttons in the first display area when operating the answer button or the ignore button, whereby it is possible to improve operability of the answer operation and the ignore operation at the time of incoming call while preventing the erroneous operation of the buttons.

(Configuration 9) A non-transitory computer-readable recording medium having a display control program recorded thereon, the display control program causing a computer of a display control device, which controls an operation of a touch panel arranged in a vehicle in cooperation with a phone device in the vehicle, to function as: an incoming call detection unit that detects an incoming call on the phone device; and a display control unit that controls the operation of the touch panel, the display control unit being configured to: provide, on a display screen of the touch panel, a first display area for displaying each of buttons used to start operating each of predetermined functions and a second display area adjacent to the first display area; and when the incoming call detection unit detects the incoming call on the phone device, display, in the second display area, an answer button for instructing the phone device to start a phone call to the incoming call and an ignore button for instructing the phone device not to answer to the incoming call, and set at least a part of the buttons displayed in the first display area to an inoperable state.

According to the display control program recorded on the recording medium of Configuration 9, since the display control device can be operated such that the answer button and the ignore button are displayed in the second display area and a part of the buttons in the first display area is set to the inoperable state, it is possible to improve the operability of the answer operation and the ignore operation at the time of incoming call while preventing the erroneous operation of the buttons.

REFERENCE SIGNS LIST 1 vehicle
2 in-vehicle connection link
3 display control device
4 processor
5 memory
6 communicator
7 touch panel
7a lower side
7b upper side
8 display
9 operation detection sensor
10 communication device
11 GNSS receiver
12 navigation device
13 air conditioning device
14 vehicle ECU
15 vehicle driving device
16 state detection device
17 object detection device
20 driver's seat
21 steering wheel
22 instrument panel
23 speed meter
24 display panel
25 passenger seat
26 mobile terminal
30 incoming call detection unit
31 display control unit
32 AV function unit
33 display control program
40 first display area
41 second display area
43a, 43b, 44, 44a, 44b, 44c, 44d, 45, 45a, 45b, 45c, 45d, 45e, 45f, 45g, 45h button
46 indicator display area
47 information display area
48 answer button
49 ignore button
50 caller information
51 area
52 mute message
53 incoming message

What is claimed is:

1. A display control device that controls an operation of a touch panel arranged in a vehicle in cooperation with a phone device in the vehicle, the display control device comprising:
   an incoming call detection unit that detects an incoming call on the phone device; and
   a display control unit that controls the operation of the touch panel,
   the display control unit being configured to:
   provide, on a display screen of the touch panel, a first display area for displaying each of buttons used to start operating each of predetermined functions and a second display area adjacent to the first display area; and
   when the incoming call detection unit detects the incoming call on the phone device,
   display, in the second display area, an answer button for instructing the phone device to start a phone call to the incoming call and an ignore button for instructing the phone device not to answer to the incoming call, and
   set and display at least a part of the buttons displayed in the first display area to an inoperable state.

2. The display control device according to claim 1, wherein
   the first display area is arranged along a side of the touch panel on a driver's seat side of the vehicle, and
   the answer button and/or the ignore button are arranged at positions adjacent to the first display area in the second display area.

3. The display control device according to claim 1, wherein
   the buttons displayed in the first display area include a common use button that is maintained in an operable state even when the incoming call detection unit detects the incoming call on the phone device, and
   the common use button is arranged at a position in the first display area that is not adjacent to the answer button and the ignore button displayed in the second display area.

4. The display control device according to claim 3, wherein
   the answer button and the ignore button are arranged on one of opposite sides of the touch panel in an up-down direction, and
   the common use button displayed in the first display area is arranged on the other of opposite sides of the touch panel in the up-down direction.

5. The display control device according to claim 3, wherein
   the display control unit hides the answer button and the ignore button when the common use button is operated.

6. The display control device according to claim 3, wherein
   the common use button includes at least one of:
   a back button used to return a display of the first display area and the second display area to a display before the incoming call is detected; and
   a home button used to return the second display area to a home screen which is a predetermined initial screen.

7. The display control device according to claim 3, wherein
   when the common use button is pressed in a case where the incoming call detection unit detects the incoming call on the phone device, the display control unit displays, in the second display area, a message indicating that an audio output is in a mute state and a message indicating that the incoming call is detected.

8. A display control method of controlling an operation of a touch panel arranged in a vehicle in cooperation with a phone device in the vehicle, the operation being executed by a computer, the display control method comprising:
- an incoming call detection step of detecting an incoming call on the phone device; and
- a display control step of controlling the operation of the touch panel,
- the display control step including:
- providing, on a display screen of the touch panel, a first display area for displaying each of buttons used to start operating each of predetermined functions and a second display area adjacent to the first display area; and
- when the incoming call on the phone device is detected in the incoming call detection step,
- displaying, in the second display area, an answer button for instructing the phone device to start a phone call to the incoming call and an ignore button for instructing the phone device not to answer to the incoming call, and
- setting and displaying at least a part of the buttons displayed in the first display area to an inoperable state.

9. A non-transitory computer-readable recording medium having a display control program recorded thereon, the display control program causing a computer of a display control device, which controls an operation of a touch panel arranged in a vehicle in cooperation with a phone device in the vehicle, to function as:
- an incoming call detection unit that detects an incoming call on the phone device; and
- a display control unit that controls the operation of the touch panel,
- the display control unit being configured to:
- provide, on a display screen of the touch panel, a first display area for displaying each of buttons used to start operating each of predetermined functions and a second display area adjacent to the first display area; and
- when the incoming call detection unit detects the incoming call on the phone device,
- display, in the second display area, an answer button for instructing the phone device to start a phone call to the incoming call and an ignore button for instructing the phone device not to answer to the incoming call, and
- set and display at least a part of the buttons displayed in the first display area to an inoperable state.

\* \* \* \* \*